US008435120B2

(12) United States Patent
Hornik et al.

(10) Patent No.: US 8,435,120 B2
(45) Date of Patent: May 7, 2013

(54) NETWORKED COMMUNITY CHEST

(75) Inventors: Jeremy M. Hornik, Chicago, IL (US); Joel R. Jaffe, Glenview, IL (US)

(73) Assignee: WMS Gaming Inc., Waukegan, IL (US)

( * ) Notice: Subject to any disclaimer, the term of this patent is extended or adjusted under 35 U.S.C. 154(b) by 365 days.

(21) Appl. No.: 12/876,344

(22) Filed: Sep. 7, 2010

(65) Prior Publication Data

US 2011/0065495 A1 Mar. 17, 2011

Related U.S. Application Data

(60) Provisional application No. 61/243,269, filed on Sep. 17, 2009.

(51) Int. Cl.
*A63F 13/00* (2006.01)

(52) U.S. Cl.
USPC .................. 463/42; 463/16; 463/17; 463/18; 463/19; 463/20; 463/25; 463/27; 463/31; 463/40; 463/43

(58) Field of Classification Search .............. 463/16–28, 463/30–34, 39–43
See application file for complete search history.

(56) References Cited

U.S. PATENT DOCUMENTS

| | | | | |
|---|---|---|---|---|
| 7,169,044 | B2 * | 1/2007 | Baerlocher et al. | 463/20 |
| 7,226,358 | B2 | 6/2007 | Miller et al. | 463/20 |
| 7,316,609 | B2 | 1/2008 | Dunn et al. | 463/16 |
| 7,371,166 | B1 | 5/2008 | Webb et al. | 463/12 |
| 2004/0176156 | A1 | 9/2004 | Walker et al. | 463/16 |
| 2005/0181856 | A1 | 8/2005 | Cannon et al. | 463/16 |
| 2006/0084494 | A1 | 4/2006 | Belger et al. | 463/20 |
| 2007/0060292 | A1 * | 3/2007 | Peterson | 463/20 |
| 2007/0082725 | A1 | 4/2007 | Low et al. | 463/16 |
| 2007/0129128 | A1 | 6/2007 | McClintic | 463/9 |
| 2008/0125206 | A1 * | 5/2008 | Mouchou et al. | 463/16 |
| 2008/0139274 | A1 * | 6/2008 | Baerlocher | 463/16 |
| 2008/0167130 | A1 | 7/2008 | Kroeckel et al. | 463/42 |
| 2008/0254868 | A1 | 10/2008 | Fujimoto et al. | 463/27 |
| 2009/0093300 | A1 | 4/2009 | Lutnick et al. | 463/26 |
| 2009/0098921 | A1 | 4/2009 | Manning et al. | 463/17 |
| 2009/0098943 | A1 | 4/2009 | Weber et al. | 463/42 |
| 2009/0104963 | A1 | 4/2009 | Burman et al. | 463/18 |
| 2009/0104965 | A1 | 4/2009 | House et al. | 463/20 |
| 2009/0156303 | A1 | 6/2009 | Kiely et al. | 463/29 |
| 2009/0197672 | A1 | 8/2009 | Kelly et al. | 463/25 |
| 2010/0093416 | A1 | 4/2010 | Seelig et al. | 463/16 |

* cited by examiner

*Primary Examiner* — Sunit Pandya
(74) *Attorney, Agent, or Firm* — Nixon Peabody LLP

(57) ABSTRACT

A wagering game in which a bonus event is triggered and during the bonus event possible bonus awards are displayed on corresponding displays of electronic gaming devices (EGDs) and eliminated one at a time until the predetermined bonus award remains and is revealed to the player. The EGDs are linked together to a main controller, and a predetermined bonus award is randomly determined for each EGD. The main controller stores all of the predetermined bonus awards for all of the EGDs participating in the bonus event, and communicates a subset of possible bonus awards to each of the EGDs, where each subset includes the predetermined bonus award to be awarded at each EGD and at least one decoy bonus award that will not be awarded. The EGDs display a bonus award show in which the decoy bonus awards are eliminated, one at a time, preferably such that the highest valued decoy bonus awards are eliminated last, until one remaining predetermined bonus award is revealed to the player.

24 Claims, 11 Drawing Sheets

NETWORKED COMMUNITY CHEST

CROSS-REFERENCE TO RELATED APPLICATION

This application claims the benefit of and priority to U.S. Provisional Application No. 61/243,269, filed Sep. 17, 2009, entitled "Networked Community Chest," and is incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to wagering games, and methods for playing wagering games, and more particularly, to a wagering game in which a bonus event is triggered, revealing a bonus award show during which bonus awards are eliminated, one at a time, until the winning bonus award is revealed.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

Communal or community games involve participation by linked gaming terminals. When players perceive that they will be on a less-than-equal-footing relative to other players of a communal game, such players might choose not to participate or become discouraged from continuing to participate. Some communal games cannot be scaled easily, and others require player interaction during the communal game, which slows down the progress of the game until all inputs are received. Progressive games can incentivize players to wait until the progressive jackpot achieves a level where the potential payoff is worth the wagering risk. Still other communal games can support only a limited number of linked electronic gaming devices.

SUMMARY OF THE INVENTION

According to an aspect of the present disclosure, a gaming system includes: a wager input device for receiving an indication of a wager; a plurality of electronic gaming devices communicatively linked together, each having a video display and each displaying on the corresponding video display a primary wagering game; and a main controller in communication with each of the gaming devices and operative to: in response to triggering a bonus event during which the gaming devices participate, store in a memory device a plurality of predetermined bonus awards, each of the predetermined bonus awards being associated with a respective one of the gaming devices, and communicate to a first of the gaming devices possible bonus awards, the possible bonus awards including the predetermined bonus award associated with the first gaming device and a plurality of decoy bonus awards corresponding to some of the predetermined bonus awards that will not be awarded at the first gaming device, causing the first gaming device to display on the video display of the first gaming device (a) the possible bonus awards, (b) an indication of which of the decoy bonus awards that will not be awarded at the first gaming device during the bonus event, and (c) an indication of the predetermined bonus award associated with the first gaming device as the predetermined bonus award to be awarded to a player of the first gaming device.

The bonus decoy awards can be obscured or removed sequentially, one at a time, from display on the video display of the first gaming device in a bonus award show lasting a duration of time until the predetermined bonus award associated with the first gaming device remains displayed, whereupon the predetermined bonus award associated with the first gaming device is known to the player for the first time since the triggering of the bonus event. The main controller can be further operative to: communicate to a second first of the gaming devices a second set of possible bonus awards, the second set of possible bonus awards including the predetermined bonus award associated with the second gaming device and a second set of decoy bonus awards corresponding to some of the predetermined bonus awards that will not be awarded at the second gaming device, causing the second gaming device to display on the display of the second gaming device (a) the second set of possible bonus awards, (b) an indication of which of the second set of decoy bonus awards will not be awarded at the second gaming device, and (c) an indication of the predetermined bonus award associated with the second gaming device as the predetermined bonus award to be awarded to a player of the second gaming device.

Each of the gaming devices can include a controller that can be operative to: randomly determine an outcome that is associated with the respective predetermined bonus award; and communicate to the main controller the respective predetermined bonus award. The main controller can be further operative to randomly determine a plurality of outcomes, each of which is associated with the predetermined bonus award associated with the respective ones of the gaming devices.

The main controller can be further operative to determine, for each of the gaming devices, a subset of the predetermined bonus awards to be communicated to each of the gaming devices as a subset of possible bonus awards for display on the corresponding video display of each of the gaming devices, wherein each subset of possible bonus awards includes the predetermined bonus award associated with the respective gaming device and decoy awards corresponding to some of the predetermined bonus awards that will not be awarded at the respective gaming device during the bonus event. The predetermined bonus award associated with the first gaming device can represent an opportunity to participate in a second bonus round in which bonus awards available to be won in the second bonus round are more valuable than the predetermined bonus award associated with the first gaming device. The main controller can be further operative to determine which of the predetermined bonus awards is the largest bonus award having the highest value among all the predetermined bonus awards, and communicate, to the gaming device associated with the largest bonus award, an indication that the gaming device associated with the largest bonus award is associated with the largest bonus award to cause the gaming device associated with the largest bonus award to produce enhanced visual or audio effects relative to the visual or audio effects produced by the other gaming devices in response to the largest bonus award being revealed on the video display of the gaming device associated with the largest bonus award. The main controller can be in one of the gaming devices.

A method of conducting a wagering game includes: receiving an indication of a wager at a wager input device; displaying a primary wagering game on a corresponding video display of each of a plurality of electronic gaming devices; associating a plurality of predetermined bonus awards with respective ones of the gaming devices; in response to triggering a bonus event during which the gaming devices participate, receiving possible bonus awards that include at least some of the predetermined bonus awards; and responsive to receiving the possible bonus awards, displaying on the video display of a first of the gaming devices (a) the possible bonus awards, which include the predetermined bonus award associated with the first gaming device and a plurality of decoy bonus awards corresponding to some of the predetermined bonus awards that will not be awarded at the first gaming device, (b) an indication of which of the decoy bonus awards will not be awarded at the first gaming device, and (c) an indication of the predetermined bonus award associated with the first gaming device as the predetermined bonus award to be awarded to a player of the first gaming device.

The method can further include obscuring or removing sequentially each of the decoy bonus awards, one at a time, from display on the video display of the first gaming device in a bonus show lasting a duration of time until the predetermined bonus award associated with the first gaming device remains displayed, whereupon the predetermined bonus award associated with the first gaming device is known to the player for the first time since the triggering of the bonus event. The duration of the award show can be dependent upon at least the types or values of the predetermined bonus awards to be awarded. Responsive to the predetermined bonus award associated with the first gaming device being the largest bonus award among the predetermined bonus awards, the method can produce enhanced visual or audio effects relative to the visual or audio effects produced by the other gaming devices in response to the largest bonus award being revealed on the video display of the first gaming device.

The method can further include: randomly determining an outcome that is associated with the respective predetermined bonus award; and communicating to a main controller communicatively linked to the gaming devices the respective predetermined bonus award.

A gaming system includes: a wager input device for receiving an indication of a wager; a plurality of electronic gaming devices communicatively linked together, each having a video display, each displaying on the corresponding video display a primary wagering game, and each including a corresponding controller; and a main controller in communication with each of the gaming devices and operative to: in response to triggering a bonus event during which the gaming devices participate, store in a memory device a plurality of predetermined bonus awards, each of the predetermined bonus awards being associated with a respective one of the gaming devices, and communicate to a first of the gaming devices possible bonus awards, which include the predetermined bonus award associated with the first gaming device and a plurality of decoy bonus awards corresponding to some of the predetermined bonus awards that will not be awarded at the first gaming device during the bonus event, wherein the controller of the first gaming device is operative to: display on the video display of the first gaming device (a) the possible bonus awards, (b) an indication of which of the decoy bonus awards will not be awarded at the first gaming device during the bonus event, and (c) an indication of the predetermined bonus award associated with the first gaming device as the predetermined bonus award to be awarded to a player of the first gaming device.

The controller of the first gaming device can be further operative to obscure or remove sequentially the decoy bonus awards, one at a time, from display on the video display of the first gaming device in a bonus award show lasting a duration of time until the predetermined bonus award associated with the first gaming device remains displayed, whereupon the predetermined bonus award associated with the first gaming device is known to the player for the first time since the triggering of the bonus event.

Each of the controllers can be operative to: randomly determine an outcome that is associated with the respective predetermined bonus award; and communicate to the main controller the respective predetermined bonus award.

One or more computer-readable storage media encoded with instructions for directing a gaming system to perform a method of conducting a wagering game, including: receiving an indication of a wager at a wager input device; displaying a primary wagering game on a corresponding video display of each of a plurality of electronic gaming devices; associating a plurality of predetermined bonus awards with respective ones of the gaming devices; in response to triggering a bonus event during which the gaming devices participate, receiving possible bonus awards; and responsive to receiving the possible bonus awards, causing the video display of a first of the gaming devices to display (a) the possible bonus awards, which include the predetermined bonus award associated with the first gaming device and a plurality of decoy bonus awards corresponding to some of the predetermined bonus awards that will not be awarded at the first gaming device during the bonus event, (b) an indication of which of the decoy bonus awards will not be awarded at the first gaming device, and (c) an indication of the predetermined bonus award associated with the first gaming device as the predetermined bonus award to be awarded to a player of the first gaming device.

The method can further include obscuring or removing sequentially each of the decoy bonus awards, one at a time, from display on the video display of the first gaming device in a bonus show lasting a duration of time until the predetermined bonus award associated with the first gaming device remains displayed, whereupon the predetermined bonus award associated with the first gaming device is known to the player for the first time since the triggering of the bonus event. The duration of the award show can be dependent upon at least the types or values of the predetermined bonus awards to be awarded.

A method of conducting a wagering game, comprising: receiving an indication of a wager; displaying a primary wagering game on each of a plurality of gaming apparatuses; associating a plurality of predetermined bonus awards with respective ones of the gaming apparatuses; in response to triggering a bonus event during which the gaming apparatuses participate, receiving possible bonus awards that include at least some of the predetermined bonus awards; and responsive to receiving the possible bonus awards, displaying on a first of the gaming apparatuses (a) the possible bonus awards, which include the predetermined bonus award associated with the first gaming device and a plurality of decoy bonus awards corresponding to some of the predetermined bonus awards that will not be awarded at the first gaming apparatus, (b) an indication of which of the decoy bonus awards will not be awarded at the first gaming apparatus, and (c) an indication of the predetermined bonus award associated with the first gaming apparatus as the predetermined bonus award to be awarded to a player of the first gaming apparatus.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
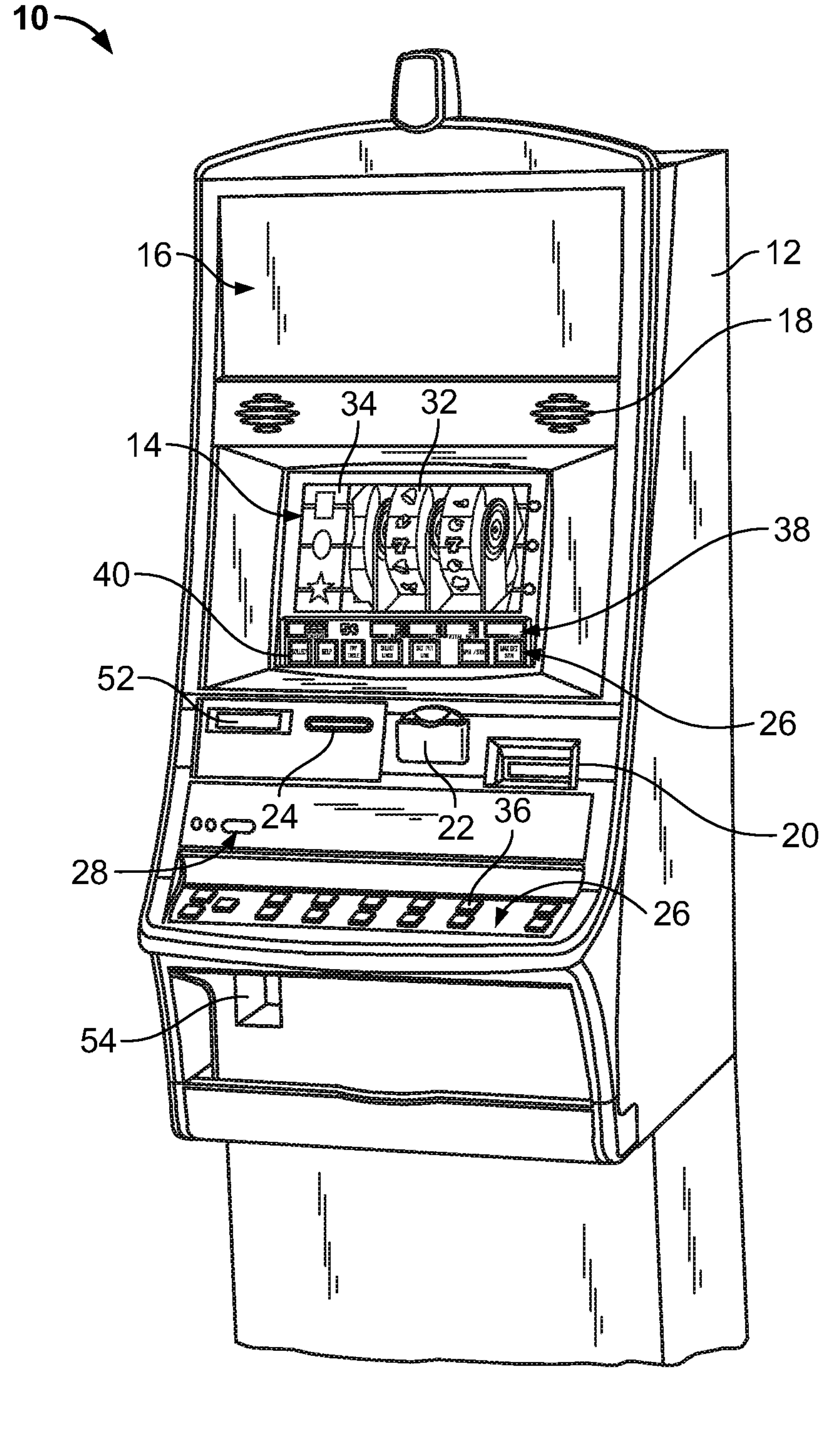
FIG. 1a (Prior Art)
FIG. 1*a* is a perspective view of a free standing gaming machine embodying the present disclosure.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1B:
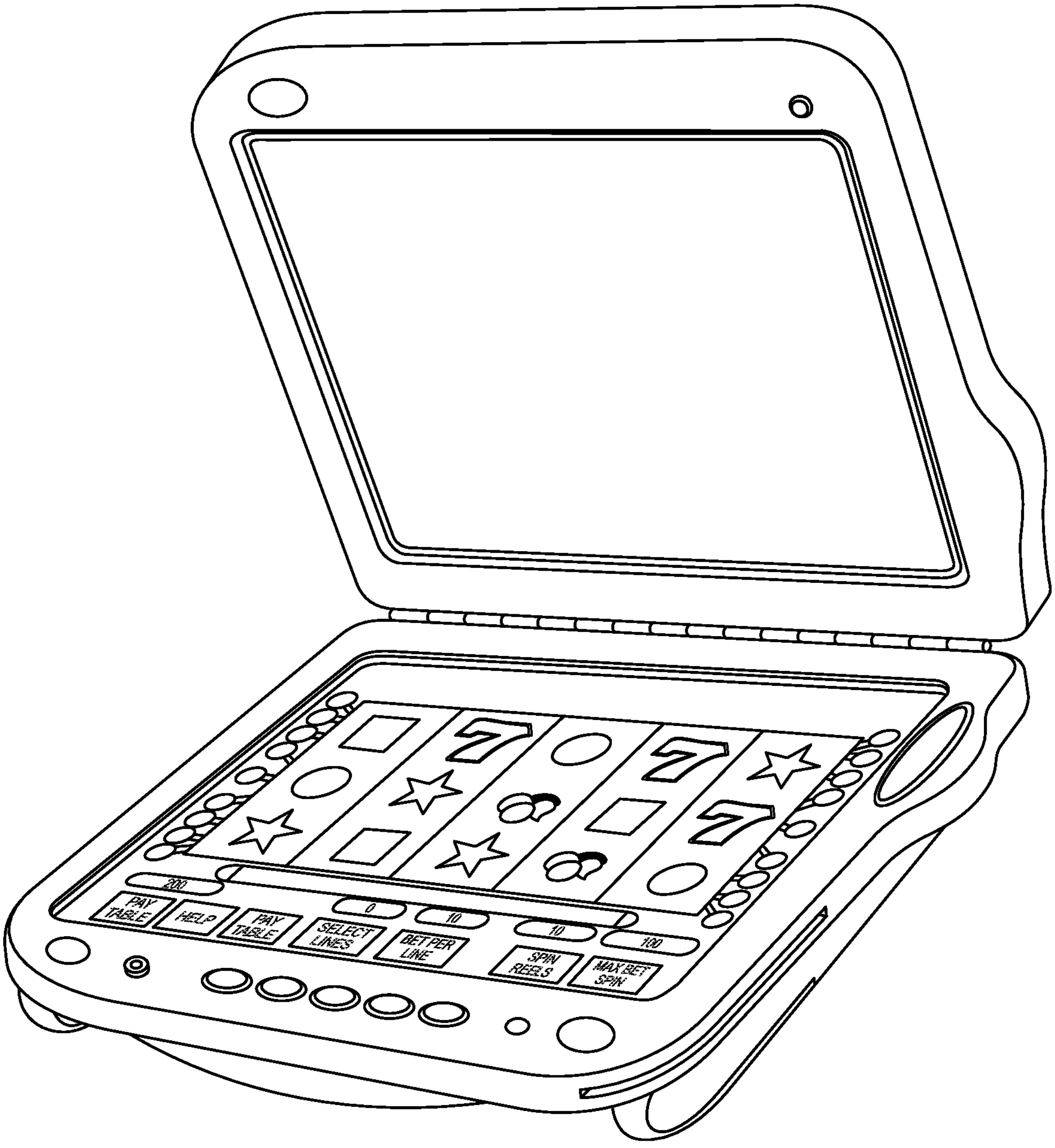
FIG. 1b (Prior Art)
FIG. 1*b* is a perspective view of a handheld gaming machine embodying the present disclosure.

Referring to FIG. 1*a*, there is shown a gaming terminal 10 similar to those used in gaming establishments, such as casinos. With regard to the present invention, the gaming terminal 10 may be any type of gaming terminal and may have varying structures and methods of operation. For example, the gaming terminal 10 may be an electromechanical gaming terminal configured to play mechanical slots, or it may be an electronic gaming terminal configured to play a video casino game, such as slots, keno, poker, blackjack, roulette, craps, etc. It should be understood that although the gaming terminal 10 is shown as a free-standing terminal of the upright type, it may take on a wide variety of other forms such as a free-standing terminal of the slant-top type, a portable or handheld device primarily used for gaming as shown in FIG. 1*b*, a mobile telecommunications device such as a mobile telephone or personal digital assistant (PDA), a counter-top or bar-top gaming terminal, or other personal electronic device such as a portable television, MP3 player, entertainment device, etc.

The illustrated gaming terminal 10 comprises a cabinet or housing 12. For output devices, the gaming terminal 10 may include a primary display area 14, a secondary display area 16, and one or more audio speakers 18. The primary display area 14 and/or secondary display area 16 may display information associated with wagering games, non-wagering games, community games, progressives, advertisements, services, premium entertainment, text messaging, emails, alerts or announcements, broadcast information, subscription information, etc. For input devices, the gaming terminal 10 may include a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements may exist and may be used in any number of combinations to create various forms of a gaming terminal.

The primary display area 14 may include a mechanical-reel display, a video display, or a combination thereof in which a transmissive video display in front of the mechanical-reel display portrays a video image superimposed over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display may be a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10. The primary display area 14 may include one or more paylines 30 (see FIG. 3) extending along a portion thereof. In the illustrated embodiment, the primary display area 14 comprises a plurality of mechanical reels 32 and a video display 34 such as a transmissive display (or a reflected image arrangement in other embodiments) in front of the mechanical reels 32. If the wagering game conducted via the gaming terminal 10 relies upon the video display 34 only and not the mechanical reels 32, the mechanical reels 32 may be removed from the interior of the terminal and the video display 34 may be of a non-transmissive type. Similarly, if the wagering game conducted via the gaming terminal 10 relies upon the mechanical reels 32 but not the video display 34, the video display 34 may be replaced with a conventional glass panel. Further, the underlying mechanical-reel display may be replaced with a video display such that the primary display area 14 includes layered video displays, or may be replaced with another mechanical or physical member such as a mechanical wheel (e.g., a roulette game), dice, a pachinko board, or a diorama presenting a three-dimensional model of a game environment.

Video images in the primary display area 14 and/or the secondary display area 16 may be rendered in two-dimensional (e.g., using Flash Macromedia™) or three-dimensional graphics (e.g., using Renderware™). The images may be played back (e.g., from a recording stored on the gaming terminal 10), streamed (e.g., from a gaming network), or received as a TV signal (e.g., either broadcast or via cable). The images may be animated or they may be real-life images, either prerecorded (e.g., in the case of marketing/promotional material) or as live footage, and the format of the video images may be an analog format, a standard digital format, or a high-definition (HD) digital format.

The player-input devices 26 may include a plurality of buttons 36 on a button panel and/or a touch screen 38 mounted over the primary display area 14 and/or the secondary display area 16 and having one or more soft touch keys 40. The player-input devices 26 may further comprise technologies that do not rely upon touching the gaming terminal, such as speech-recognition technology, gesture-sensing technology, eye-tracking technology, etc.

The information reader 24 is preferably located on the front of the housing 12 and may take on many forms such as a ticket reader, card reader, bar code scanner, wireless transceiver (e.g., RFID, Bluetooth, etc.), biometric reader, or computer-readable-storage-medium interface. Information may be transmitted between a portable medium (e.g., ticket, voucher, coupon, casino card, smart card, debit card, credit card, etc.) and the information reader 24 for accessing an account associated with cashless gaming, player tracking, game customization, saved-game state, data transfer, and casino services as more fully disclosed in U.S. Patent Publication No. 2003/0045354 entitled "Portable Data Unit for Communicating With Gaming Machine Over Wireless Link," which is incorporated herein by reference in its entirety. The account may be stored at an external system 46 (see FIG. 2) as more fully disclosed in U.S. Pat. No. 6,280,328 to Holch et al. entitled "Cashless Computerized Video Game System and Method," which is incorporated herein by referenced in its entirety, or directly on the portable medium. To enhance security, the individual carrying the portable medium may be required to enter a secondary independent authenticator (e.g., password, PIN number, biometric, etc.) to access their account.

FIG. 1*b* illustrates a portable or handheld device primarily used to display and/or conduct wagering games. The handheld device may incorporate the same features as the gaming terminal 10 or variations thereof. A more detailed description of a handheld device that may be utilized with the present invention can be found in PCT Patent Application No. PCT/US2007/000792 filed Jan. 26, 2007, entitled "Handheld Device for Wagering Games," which is incorporated herein by reference in its entirety.

Figure 2:
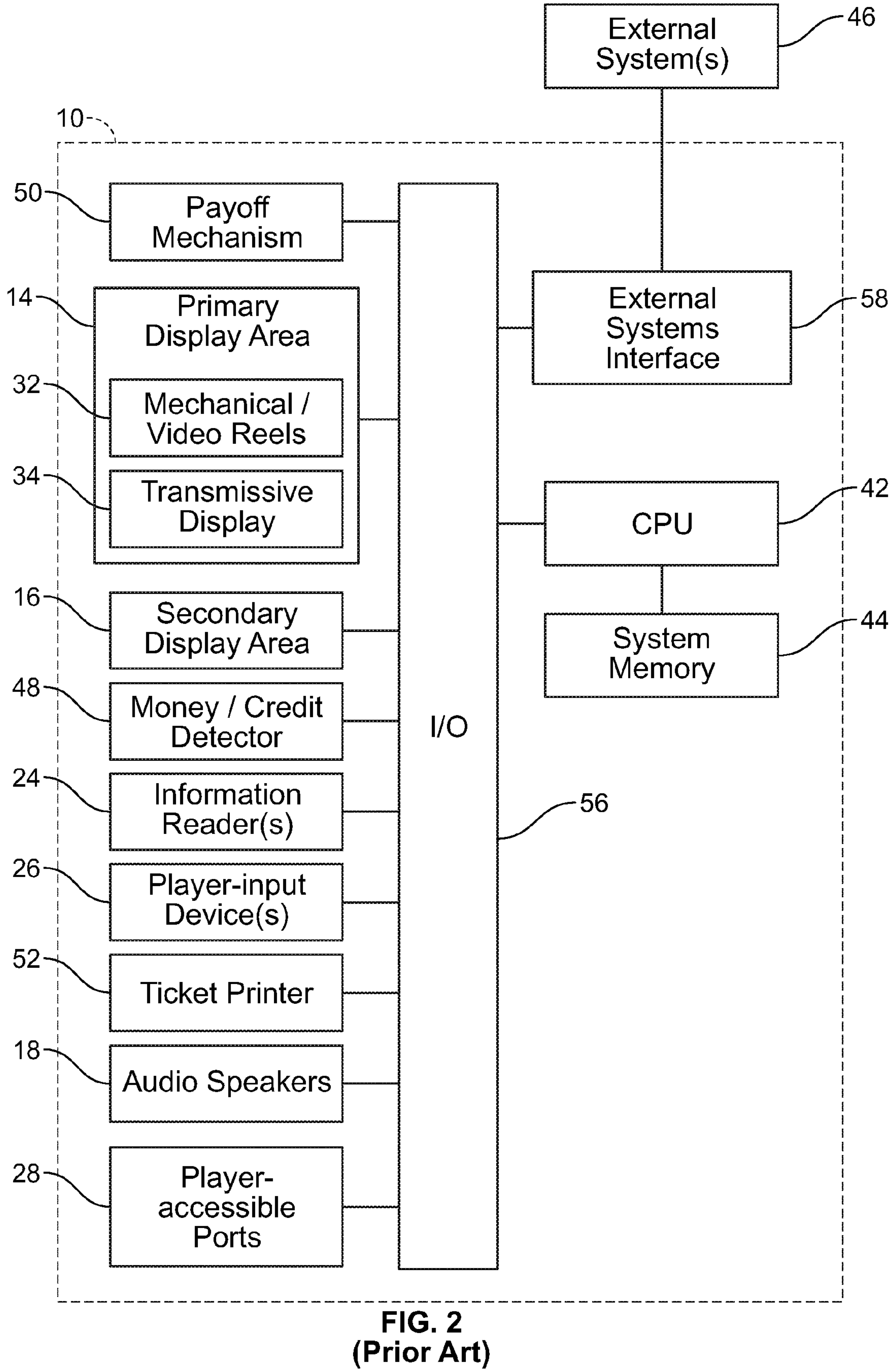
FIG. 2 (Prior Art)
FIG. 2 is a block diagram of a control system suitable for operating the gaming machines of FIGS. 1*a* and 1*b;*

Turning now to FIG. 2, the various components of the gaming terminal 10 are controlled by a central processing unit (CPU) 42, also referred to herein as a controller or processor (such as a microcontroller or microprocessor). The CPU 42 can include any suitable processor, such as an INTEL® Pentium processor, INTEL® Core 2 Duo processor, AMD OPTERON™ processor, or ULTRASPARC® processor. To provide gaming functions, the controller 42 executes one or more game programs stored in one or more computer readable storage media in the form of memory 44 or other suitable storage device. The controller 42 uses a random number generator (RNG) to randomly generate a wagering game outcome from a plurality of possible outcomes. Alternatively, the outcome may be centrally determined using either an RNG or pooling scheme at a remote controller included, for example, within the external system 46. It should be appreciated that the controller 42 may include one or more microprocessors, including but not limited to a master processor, a slave processor, and a secondary or parallel processor.

The controller 42 is coupled to the system memory 44 and also to a money/credit detector 48. The system memory 44 may comprise a volatile memory (e.g., a random-access memory (RAM)) and a non-volatile memory (e.g., an EEPROM). The system memory 44 may include multiple RAM and multiple program memories. The money/credit detector 48 signals the processor that money and/or credits have been input via a value-input device, such as the bill validator 20, coin acceptor 22, or via other sources, such as a cashless gaming account, etc. These components may be located internal or external to the housing 12 of the gaming terminal 10 and connected to the remainder of the components of the gaming terminal 10 via a variety of different wired or wireless connection methods. The money/credit detector 48 detects the input of funds into the gaming terminal 10 (e.g., via currency, electronic funds, ticket, card, etc.) that are generally converted into a credit balance available to the player for wagering on the gaming terminal 10. The credit detector 48 detects when a player places a wager (e.g., via a player-input device 26) to play the wagering game, the wager then generally being deducted from the credit balance. The money/credit detector 48 sends a communication to the controller 42 that a wager has been detected and also communicates the amount of the wager.

As seen in FIG. 2, the controller 42 is also connected to, and controls, the primary display area 14, the player-input device 26, and a payoff mechanism 50. The payoff mechanism 50 is operable in response to instructions from the controller 42 to award a payoff to the player in response to certain winning outcomes that might occur in the base game, the bonus game(s), or via an external game or event. The payoff may be provided in the form of money, redeemable points, services or any combination thereof. Such payoff may be associated with a ticket (from a ticket printer 52), portable data unit (e.g., a card), coins, currency bills, accounts, and the like. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 may include a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface 58, which is connected to the external system 46. The controller 42 communicates with the external system 46 via the external system interface 58 and a communication path (e.g., serial, parallel, IR, RC, 10bT, etc.). The external system 46 may include a gaming network, other gaming terminals, a gaming server, a remote controller, communications hardware, or a variety of other interfaced systems or components.

Controller 42, as used herein, comprises any combination of hardware, software, and/or firmware that may be disposed or resident inside and/or outside of the gaming terminal 10 and may communicate with and/or control the transfer of data between the gaming terminal 10 and a bus, another computer, processor, or device and/or a service and/or a network. The controller 42 may comprise one or more controllers or processors. In FIG. 2, the controller 42 in the gaming terminal 10 is depicted as comprising a CPU, but the controller 42 may alternatively comprise a CPU in combination with other components, such as the I/O circuit 56 and the system memory 44. The controller 42 is operable to execute all of the various gaming methods and other processes disclosed herein.

The gaming terminal 10 may communicate with external system 46 (in a wired or wireless manner) such that each terminal operates as a "thin client" having relatively less functionality, a "thick client" having relatively more functionality, or with any range of functionality therebetween (e.g., a "rich client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets may be contained within the gaming terminal 10 ("thick client" gaming terminal), the external systems 46 ("thin client" gaming terminal), or distributed therebetween in any suitable manner ("rich client" gaming terminal).

Figure 3:
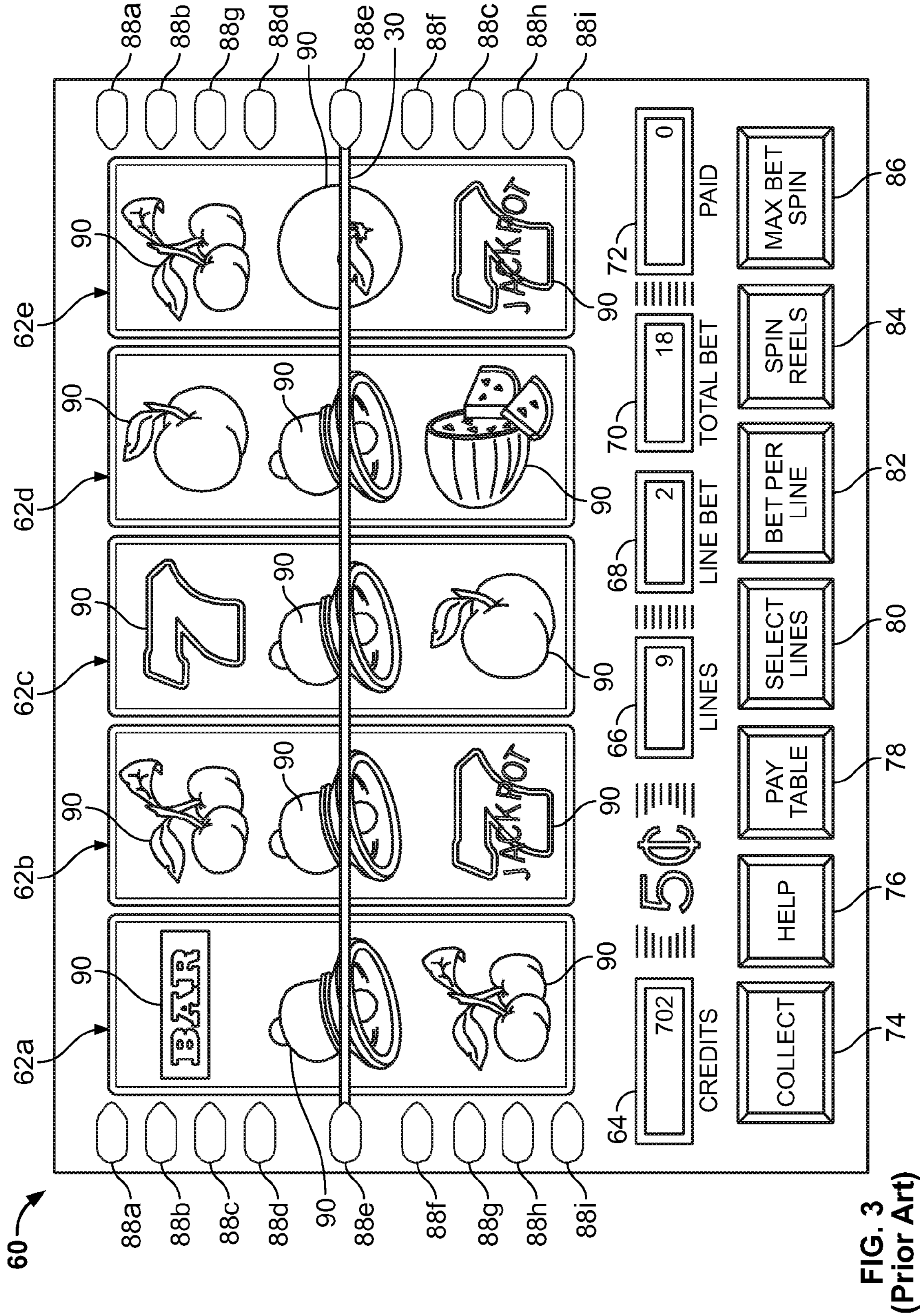
FIG. 3 (Prior Art)
FIG. 3 is a perspective view of a plurality of linked gaming machines and a community display embodying the present disclosure.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

The basic-game screen 60 may be displayed on the primary display area 14 or a portion thereof. In FIG. 3, the basic-game screen 60 portrays a plurality of simulated movable reels 62*a-e*. Alternatively or additionally, the basic-game screen 60 may portray a plurality of mechanical reels. The basic-game screen 60 may also display a plurality of game-session meters and various buttons adapted to be actuated by a player.

In the illustrated embodiment, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The user-selectable buttons may include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

Paylines 30 may extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46.

The symbols 90 may include any appropriate graphical representation or animation, and may further include a "blank" symbol.

Symbol combinations may be evaluated as line pays or scatter pays. Line pays may be evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown, a gaming terminal with any plurality of reels may also be used in accordance with the present invention.

Figure 4:
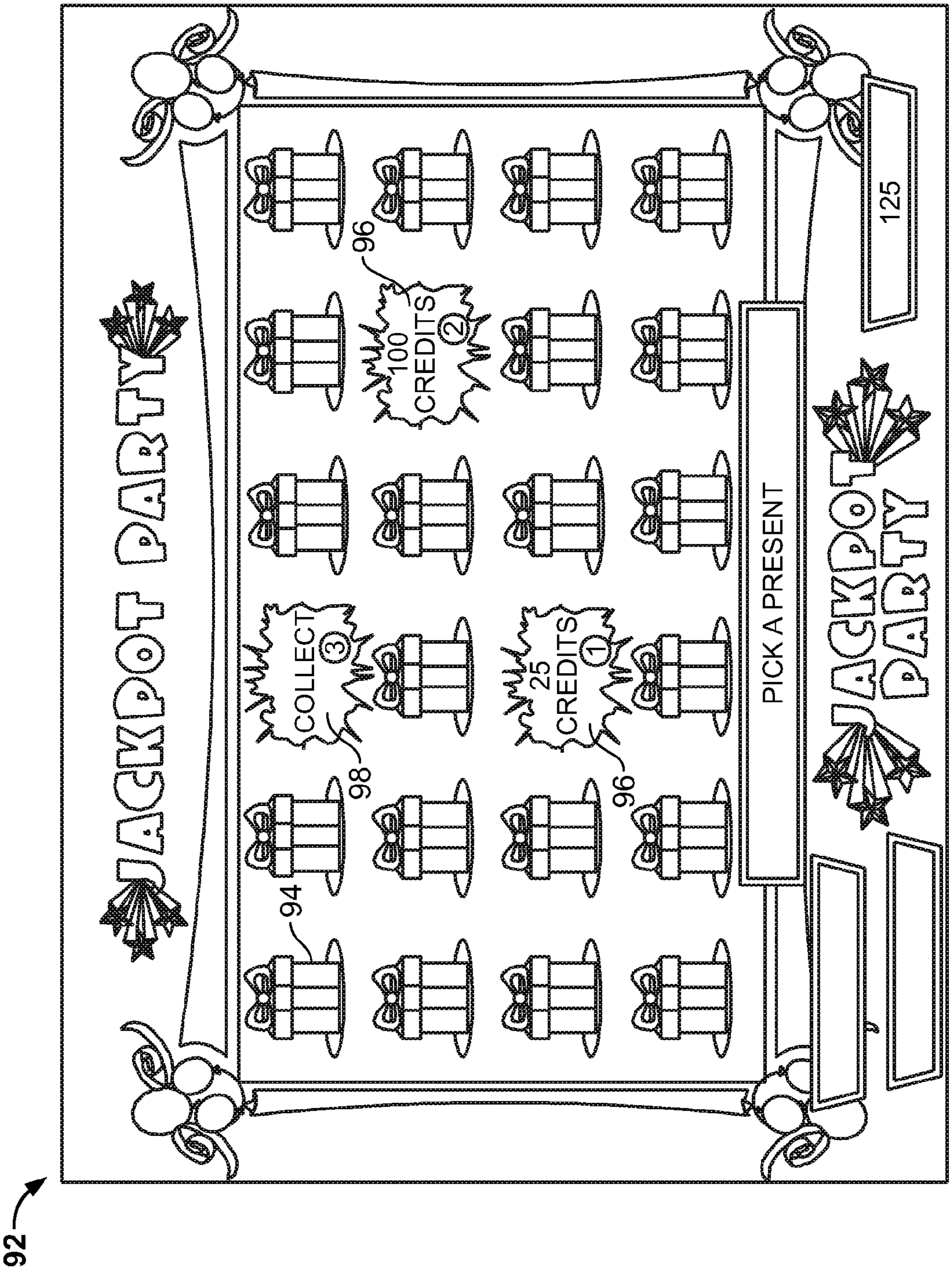
FIG. 4 (Prior Art)
FIG. 4 is a view of a primary display displaying a base game that can be played on the gaming machines according to embodiments of the present disclosure.

Turning now to FIG. 4, a bonus game that may be included with a basic wagering game is illustrated, according to one embodiment. A bonus-game screen 92 includes an array of markers 94 located in a plurality of columns and rows. The bonus game may be entered upon the occurrence of a special start-bonus game outcome (e.g., symbol trigger, mystery trigger, time-based trigger, etc.) in or during the basic wagering game. Alternatively, the illustrated game may be a stand-alone wagering game.

In the illustrated bonus game, a player selects, one at a time, from the array of markers 94 to reveal an associated bonus-game outcome. According to one embodiment, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Figure 5:
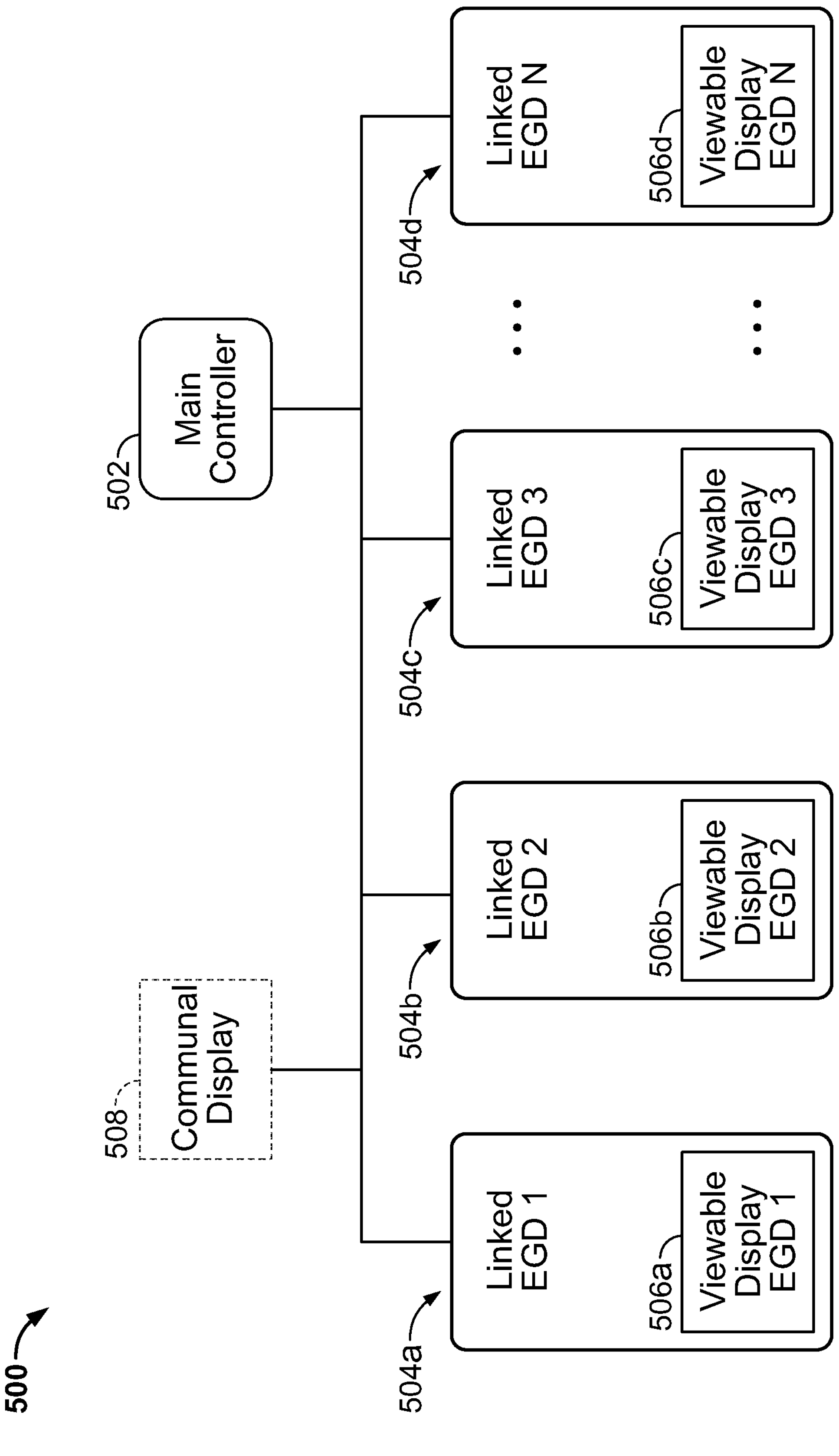
FIG. 5 is a functional block diagram of a gaming system including a main controller in communication with N electronic gaming devices operable to conduct a wagering game according to aspects of the present disclosure.

FIG. 5 is a functional block illustration of a gaming system 500 that includes a main controller 502 in communication with a number, N, of electronic gaming terminals or devices (EGDs) 504*a-d*, each having corresponding video displays 506*a-d* viewable by a player of the corresponding electronic gaming device. The main controller 502 can be incorporated into another electronic gaming device or can be incorporated in a gaming server, such as in the external system 46 mentioned above. Each of the electronic gaming devices 504*a-d* is communicatively linked to one another, such that data or signals can be communicated between any electronic gaming device 504 and any other linked electronic gaming device 504 in the gaming system 500 and the main controller 502. An optional communal display 508 can be operatively coupled to each of the electronic gaming devices 504*a-d* for displaying a communal bonus game. Examples of communal bonus games are disclosed in commonly assigned WO2009/061383, entitled "Gaming System Having Graphical Indicators of Community Bonus Awards," filed Nov. 3, 2008, the contents of which are incorporated herein by reference in their entirety. Each of the EGDs 504*a-d* conducts and displays on their corresponding video display 506*a-d* a primary wagering game, such as the one shown and described in connection with FIG. 3.

Each of the electronic gaming devices 504*a-d* can be based on any of the gaming terminals described above, including the gaming terminal 10 of FIG. 1*a* and the handheld device of FIG. 1*b*. Each of the EGDs 504*a-d* includes a wager input device, such as the player-input device 26, for receiving an indication of a wager.

Figure 6:
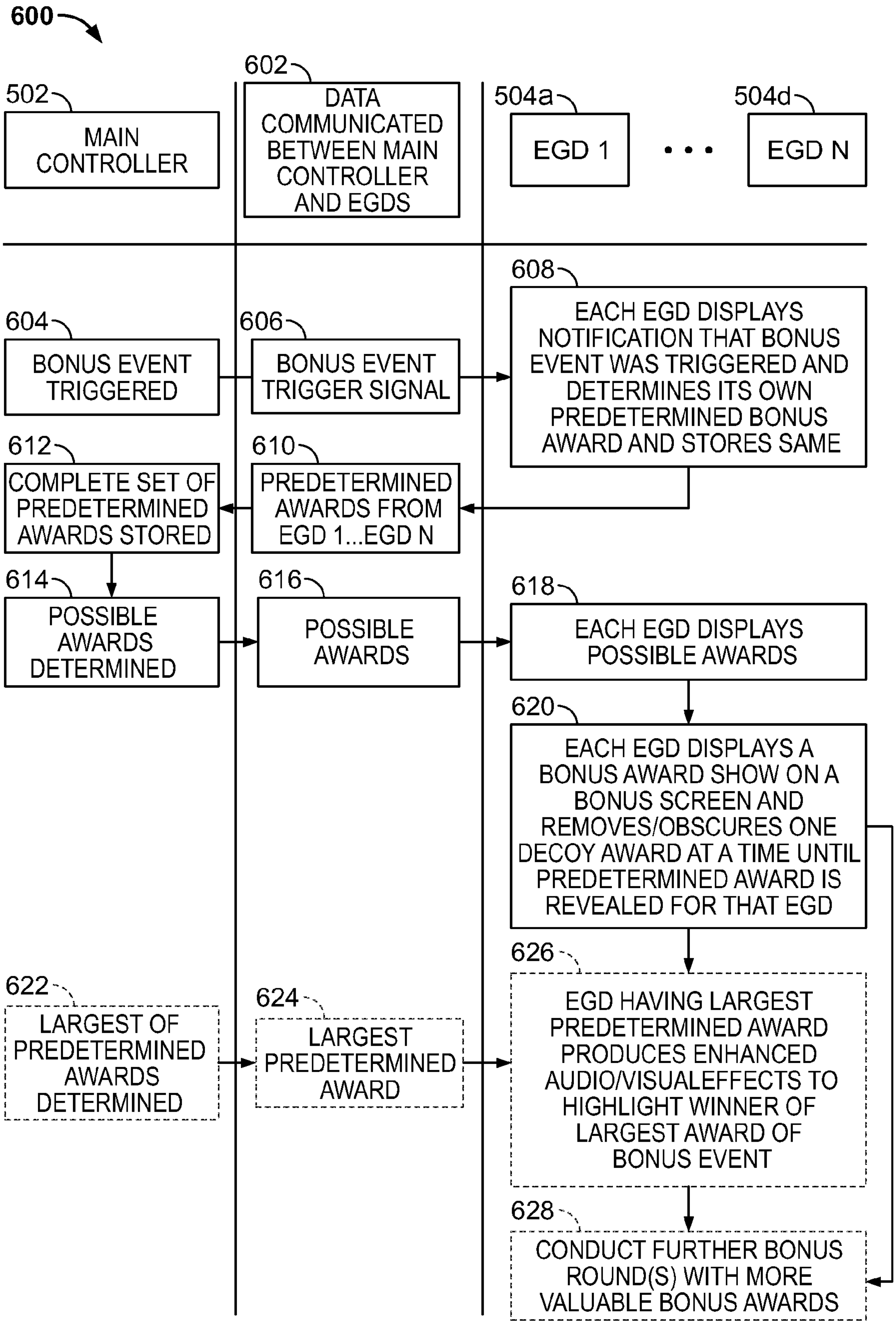
FIG. 6 is a flow diagram of an exemplary algorithm for conducting a wagering game in which each EGD randomly determines its own predetermined bonus award.
Figure 7:
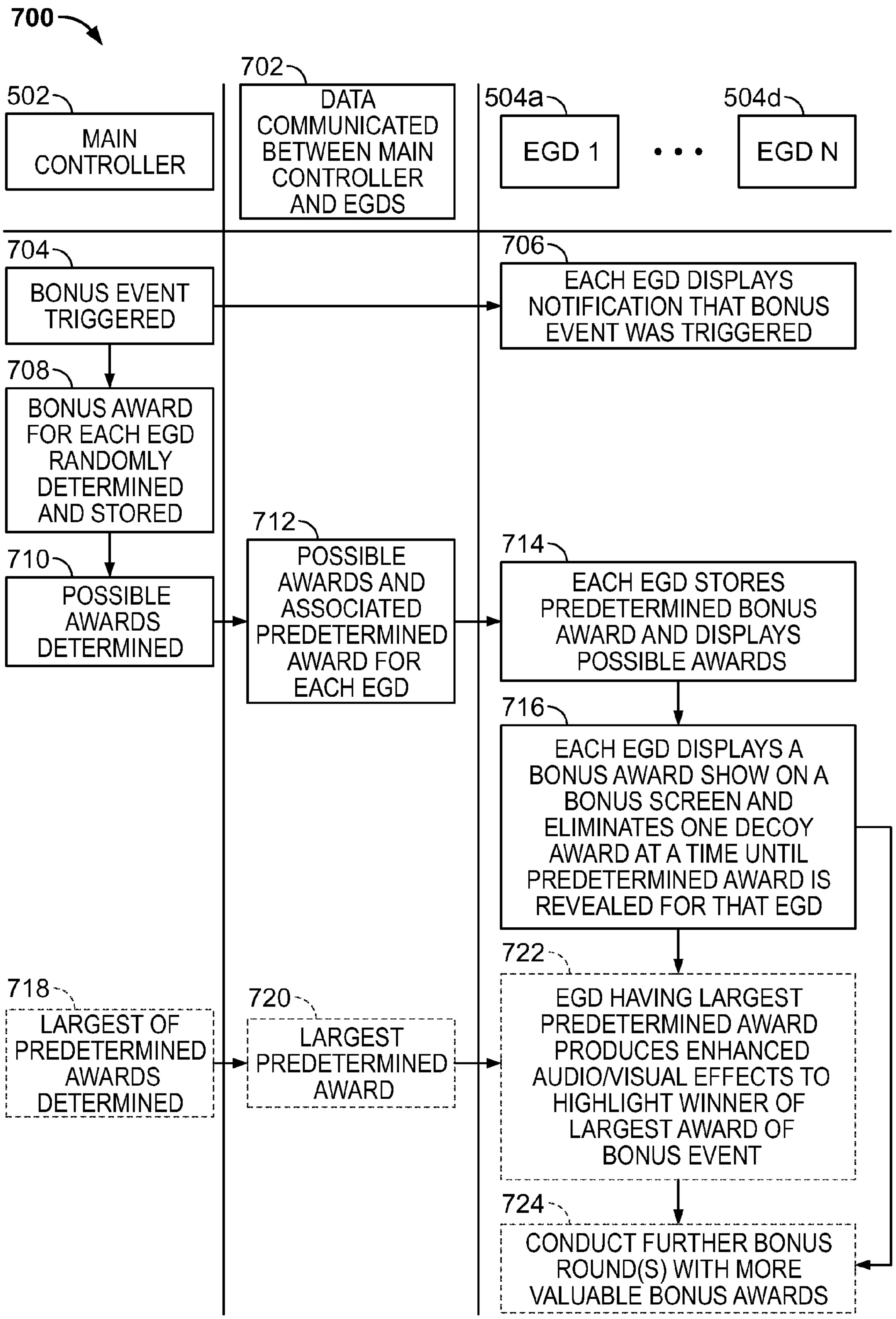
FIG. 7 is a flow diagram of another exemplary algorithm for conducting a wagering game in which the main controller randomly determines a predetermined bonus award for each EGD.

FIG. 6 is a flow diagram of an exemplary algorithm 600 for conducting a wagering game in which each EGD 504 randomly determines its own bonus award (also called a "predetermined bonus award") in response to a bonus event being triggered. By contrast, FIG. 7 is a flow diagram of an algorithm 700 for conducting a wagering game in which the main controller 502, instead of each EGD, randomly determines each predetermined bonus award associated with each EGD 504 in response to a bonus event being triggered. Referring first to FIG. 6, three columns are presented in which the left column represents functions carried out the main controller 502, the middle column represents the data or signal communicated between the main controller 504 and one or more of the EGDs 504 (602), and the right column represents functions carried out by one or more of the EGDs 504, such as via the controller 42 shown in FIG. 2. As shown in FIG. 6, a bonus event is triggered by the main controller 502. Alternately, the bonus event can be triggered by any of the EGDs 504.

The bonus event can be triggered or activated upon any of the EGDs 504 achieving a predetermined outcome or in a random manner disassociated with the play of the EGDs 504. Alternately, the bonus event can be triggered when a predetermined threshold is achieved or when a predetermined period of time has elapsed. Optionally, some or all of the EGDs must qualify for participation in the bonus event. Alternately, all EGDs can participate in the bonus event when it is triggered. The "bonus event" is differentiated from the primary wagering games played on the individual EGDs in that the bonus event is a community game conducted across multiple linked EGDs. The terms "bonus event," "bonus game," and "community game" can be used interchangeably herein. Examples of community games as differentiated from wagering games played on individual EGDs are disclosed in commonly assigned WO2009/061463, entitled "Gaming System Having Community Games With Enhanced Individual Outcomes," filed Nov. 7, 2008.

In response to the bonus event being triggered (604), the main controller 502 communicates a bonus event trigger signal 606 to all of the EGDs 504, each of which in turn displays a notification that a bonus event was triggered and randomly determines its own associated predetermined bonus award and stores that predetermined bonus award (608). Examples of triggering and notifying players of bonus events are disclosed in commonly assigned WO2009/061463, entitled "Gaming System Having Community Games With Enhanced Individual Outcomes," filed Nov. 7, 2008. The EGDs 504, upon determining its associated predetermined bonus award, do not reveal or present their associated predetermined bonus award to the player. In other words, at this point in the bonus event, the predetermined bonus awards remain unknown to the players of the EGDs. Each EGD 504 communicates to the main controller 502 the associated predetermined bonus award randomly determined by each EGD 504. For example, the predetermined bonus awards may have been randomly determined for each EGD 504 as follows: 15 credits for EGD 504*a,* 100 credits for EGD 504*b,* 30 credits for EGD 504*c*, and 2500 credits for EGD 504*d*. Each of the EGDs 504*a-d* communicates its respective predetermined bonus award to the main controller 502, which stores a complete set of all of the predetermined bonus awards in a conventional memory device (612). In this example, the main controller 502 stores 15, 100, 30, 2500, and others (not shown) as the complete set of predetermined bonus awards.

Depending upon the number of participants in the bonus event, the main controller 502 can determine a subset of possible bonus awards (614) from the complete set of bonus awards for each of the EGDs. A possible bonus award can be a decoy bonus award, which is not awarded to the player, or a predetermined bonus award, which will be awarded to the player. The possible awards can be a subset of the complete set of predetermined awards. Each possible bonus award subset includes at least the predetermined bonus award associated with the EGD which is to receive the subset. Alternately, the possible awards can correspond to the complete set of predetermined bonus awards, and the main controller 502 can communicate the complete set of predetermined bonus awards to each of the EGDs 504, for example, when there are a relative few number of participants in the bonus event. For example, if there are nine EGDs 504 participating in the bonus event, the main controller 502 can communicate all nine predetermined bonus awards to each participating EGD 504. On the other hand, if there are two hundred EGDs participating in the bonus event, the main controller 502 can determine twenty different possible award subsets of ten possible bonus awards each (9 decoy bonus awards and one predetermined bonus award), in which each possible award subset includes the corresponding predetermined bonus award for the EGD that is to receive the possible award subset and nine other decoy bonus awards that can be randomly determined or determined in a predetermined manner. A decoy bonus award is a bonus award that is displayed during the bonus award show, but is not actually an award that will be awarded to the player at the conclusion of the bonus award show.

If the main controller 502 determines one or more possible award subsets to be communicated to the EGDs 504, the main controller 502 communicates the possible award subsets 616 to each of the EGDs 504. In the 200 EGD example above, the main controller 502 communicates a first possible award subset 616 containing a combination of ten possible bonus awards including the predetermined bonus award associated with a first EGD 504*a* and nine other decoy bonus awards to EGD 504*a*. The main controller 502 communicates a second possible award subset 616 containing a different combination of ten possible bonus awards including the predetermined bonus award associated with a second EGD 504*b* and nine other decoy bonus awards to EGD 504*b*, and so on until all of the EGDs 504 receive their corresponding possible award subsets. Each EGD 504 displays the corresponding possible bonus awards in the subset (618) in a visually pleasing array or arrangement, such as a pyramid, as described in more detail below. A possible award subset includes at least some decoy bonus awards and one predetermined bonus award to be awarded. A bonus award subset can also include all of the decoy bonus awards and one predetermined bonus award to be awarded. Preferably, each possible bonus award subset includes the highest possible bonus award or a large one of the possible bonus awards to increase anticipation and excitement. Thus, if there are one hundred EGDs participating in the bonus event such that there are one hundred possible bonus awards, and the highest or most valuable of those possible bonus awards is 2500 credits, some or all of the possible award subsets can include the bonus award of 2500 credits to increase the anticipation that the player might win the 2500 credits bonus award.

Each EGD 504 displays a bonus award show on a bonus screen that removes or obscures sequentially one decoy bonus award at a time until the predetermined bonus award associated with the corresponding EGD 504 (such predetermined bonus award is also termed herein as a "winning bonus award"; all other decoy bonus awards are also termed "non-winning bonus awards") is revealed to the player (620). By "revealed to the player," it is meant that the bonus award associated with the EGD 504 becomes known to the player.

The revelation at block 620 of the predetermined bonus award to the player is the first time since the bonus event was triggered that the predetermined bonus award is known to the player. For example, initially, during the bonus award show, the predetermined bonus award is displayed along with other decoy bonus awards that will not be awarded to the player of a particular EGD. In this example, the predetermined bonus award has not yet been revealed to the player because the player does not yet know that the player has won the predetermined bonus award until all of the other decoy bonus awards are eliminated or obscured from the bonus screen. In other words, although the predetermined bonus award is visible to the player and the player can see the predetermined bonus award, the player does not realize yet that the predetermined bonus award is the one that will be awarded at the conclusion of the bonus award show until all of the other decoy bonus awards are indicated as being non-winning. In an example, decoy bonus awards are removed from being displayed on the array of the bonus screen and are thus no longer visible.

Other ways of obscuring without removing the decoy bonus awards are also contemplated. For example, other examples of obscuring include: the decoy bonus awards can be dimmed, changed to a different color or graphic, struck-through with a line or other graphic, or otherwise indicated to the player that the decoy bonus award will not be awarded at that EGD. During the duration of the bonus award show, one by one, each of the decoy bonus awards is removed or obscured from the bonus screen, increasing the player's anticipation and excitement. Because other possible bonus awards are visible to the player, and the player knows that a predetermined one of them is going to be awarded at that EGD, a sense of anticipation and excitement is created in which the player hopes to be awarded the best bonus award or the bonus award with the highest value. The sequence in which the decoy bonus awards are removed or obscured can be determined randomly or according to a predetermined sequence. For example, the lower decoy bonus awards can be eliminated first, creating in the player a sense of anticipation that the predetermined bonus award to be awarded at that EGD might be one of the remaining higher decoy bonus awards.

Every player at the EGDs participating in the bonus event has an equal chance at winning the best or most valuable possible bonus award. The benefits of this technique are magnified the more EGDs that participate in the bonus event. Suppose the highest possible bonus award is 1000 credits, and there is a 1 in 100 chance of receiving this highest possible bonus award. If there are 100 EGDs participating in this bonus event, each time the bonus event is triggered, the highest bonus award will likely be displayed on each participating EGD. Each player knows that every possible bonus award shown on his or her screen will be awarded to some player, and each player knows that they have an equal chance at being awarded the highest bonus award as every other player. Even though each EGD's bonus award is randomly determined at the time the bonus event is triggered and before the bonus award show is displayed to the players, no perceived disadvantage is felt by the players, as each one perceives him- or herself to have an equal chance at winning the highest bonus award. It is just not revealed to the player until the bonus award show ends with the predetermined bonus award being indicated as the one to be awarded at the EGD.

Other advantages of the bonus event wagering game described herein is that there is no limit to the number of EGDs 504 that can participate in the bonus event. The bonus event is not a progressive event in that each EGD 504 independently randomly determines its own predetermined bonus award (or the main controller 502 randomly determines each EGD's associated predetermined bonus award). The bonus event can be triggered as frequently at a relatively small bank of linked EGDs as it can at a relatively large bank of linked EGDs. The bonus event requires no interaction by the players of the EGDs. No additional inputs are required from the players to trigger the bonus event or during the bonus event, so the duration of the award show can be completely controlled by the EGDs 504 or by the main controller 502. In addition, the bonus event can be easily re-themed to suit a particular casino or a different primary wagering game, for example. The bonus award show can be customized for each EGD 504, depending upon the theme of the primary wagering game played thereon.

The duration of the bonus award show can be determined as a function of the types or values of the possible bonus awards. For example, when the highest or most valuable bonus award among the complete set of all bonus awards is relatively high (e.g., within the top 25% of the highest possible bonus award), the duration of the bonus award show can be lengthened compared to when the highest or most valuable bonus award among the complete set of bonus awards is relatively low (e.g., within the bottom 25% of the highest possible bonus award) to increase the sense of anticipation and excitement. Alternately, if no large bonus awards are to be awarded (e.g., they are all within the bottom 25% of the highest possible bonus award), the bonus award show can be canceled or not invoked in which case each EGD 504 displays its associated predetermined bonus award immediately after displaying the possible bonus award subset. Preferably, the duration of the bonus award show lasts no longer than 30 seconds, such as between 15-20 seconds.

Optionally, the main controller 502 can determine the largest of the complete set of bonus awards from the bonus awards stored in block 612 (622). The largest bonus award can include the predetermined bonus award having the highest value, such as the predetermined bonus award having the most number of credits. Of course, the bonus awards herein are not limited to credits. The bonus awards can alternatively include multipliers or other rule-modifier assets, game enhancements, progressives, wilds, or an opportunity to participate in a further bonus round. Once the main controller 502 has determined the largest bonus award from among the complete set of stored bonus awards 612, it communicates the largest predetermined bonus award 624 to the associated EGD that randomly determined the largest predetermined bonus award 624. The EGD that randomly determined the largest predetermined bonus award 624 produces enhanced audio and/or visual effects relative to the audio or visual effects produced by the other EGDs to highlight and draw attention to the player at that EGD being the winner of the largest predetermined bonus award of the bonus event. The enhanced audio effects can include an audio song or jingle played at an enhanced volume that is not produced by the other EGDs. The enhanced visual effects can include lighting effects that are not produced by the other EGDs. Many other ways of enhancing audio and visual effects for an EGD to differentiate that EGD from other EGDs are conventionally known and contemplated herein. The EGD that produces the enhanced audio or visual effects causes other players to look to see who won the largest predetermined bonus award and focuses attention on the player of the EGD that randomly determined the largest predetermined bonus award.

As mentioned above, the predetermined bonus awards can include an opportunity to participate in a further bonus round. In this optional example, the EGDs that randomly determined such predetermined bonus awards conduct a second bonus round in which the bonus awards available to be won during the second bonus round are more valuable than the predetermined bonus awards produced by the EGDs in first round of the bonus event (628). This adds excitement and anticipation as the player is expecting to win a higher valued bonus award. There can be any number of bonus rounds during the bonus event, such as one, two, or more than two. The number of bonus rounds can be based on the total number of EGDs participating in the first round of the bonus game of the bonus event, and can extend for two, three, four, or more rounds thereafter, with each round optionally providing more valuable bonus awards than the previous round. For example, the more players who participate in the bonus event, the more bonus rounds are made available during the bonus event. In other words, the number of bonus rounds in the bonus event can be proportional to the number of participating EGDs in the bonus event. As such, a larger number of players are incentivized to place wagers on the EGDs to increase the number of bonus rounds, each with an incrementally higher or more valuable set of bonus awards to be won. Players will encourage non-players to participate because the more players that participate, the more valuable the bonus awards become available to be won.

FIG. 7 is similar to FIG. 6 except that the predetermined bonus awards for each EGD 504*a,b,c,d* are randomly determined by the main controller 502 instead of by the EGDs 504. An algorithm 700 for conducting a wagering game is shown. As can be seen from the illustration, no data is necessarily communicated from the EGDs 504 to the main controller 502. A bonus event is triggered (704) by the main controller 502 (or, alternately, as discussed above, by one or more of the EGDs 504). Each EGD 504 displays a notification that the bonus event was triggered (706), by for example, displaying a graphic indicative of the bonus event being triggered.

The main controller 502 randomly determines a predetermined bonus award for each EGD 504*a,b,c,d* and stores each predetermined bonus award in a memory device along with the associated EGD (708) to produce a complete set of predetermined bonus awards. This differs from FIG. 6 in which each EGD 504 determined its own associated predetermined bonus award. The main controller 502 determines a possible bonus award subset (710) for each EGD. Each possible bonus award subset to be communicated to an EGD includes the predetermined bonus award for that EGD and one or more decoy bonus awards. The main controller 502 communicates the possible bonus award subsets 712 including their associated predetermined bonus awards for each EGD to the corresponding EGD. As noted above, the main controller 502 can communicate the set of all predetermined bonus awards to all of the EGDs, for example, in situations where there are a relatively small number of participating EGDs.

Each EGD 504 stores the associated predetermined bonus award and displays the corresponding possible bonus award subset (714). Each EGD 504 displays a bonus award show on a bonus screen of the video display of the EGD and indicates which decoy bonus awards, one at a time, are not winning bonus awards until the predetermined bonus award associated with the EGD is revealed to the player (716). Optionally, the main controller 502 can determine the largest of the predetermined bonus awards from among the complete set of all predetermined bonus awards (718) and communicate the largest predetermined bonus award 720 to the corresponding EGD associated with the largest predetermined bonus award. The EGD having the largest predetermined bonus award produces audio and/or visual effects to highlight the winner of the largest predetermined bonus award of the bonus event (722). Optionally, the EGDs can conduct one or more further bonus rounds each with more valuable bonus awards compared to the previous round (724).

Figure 8:
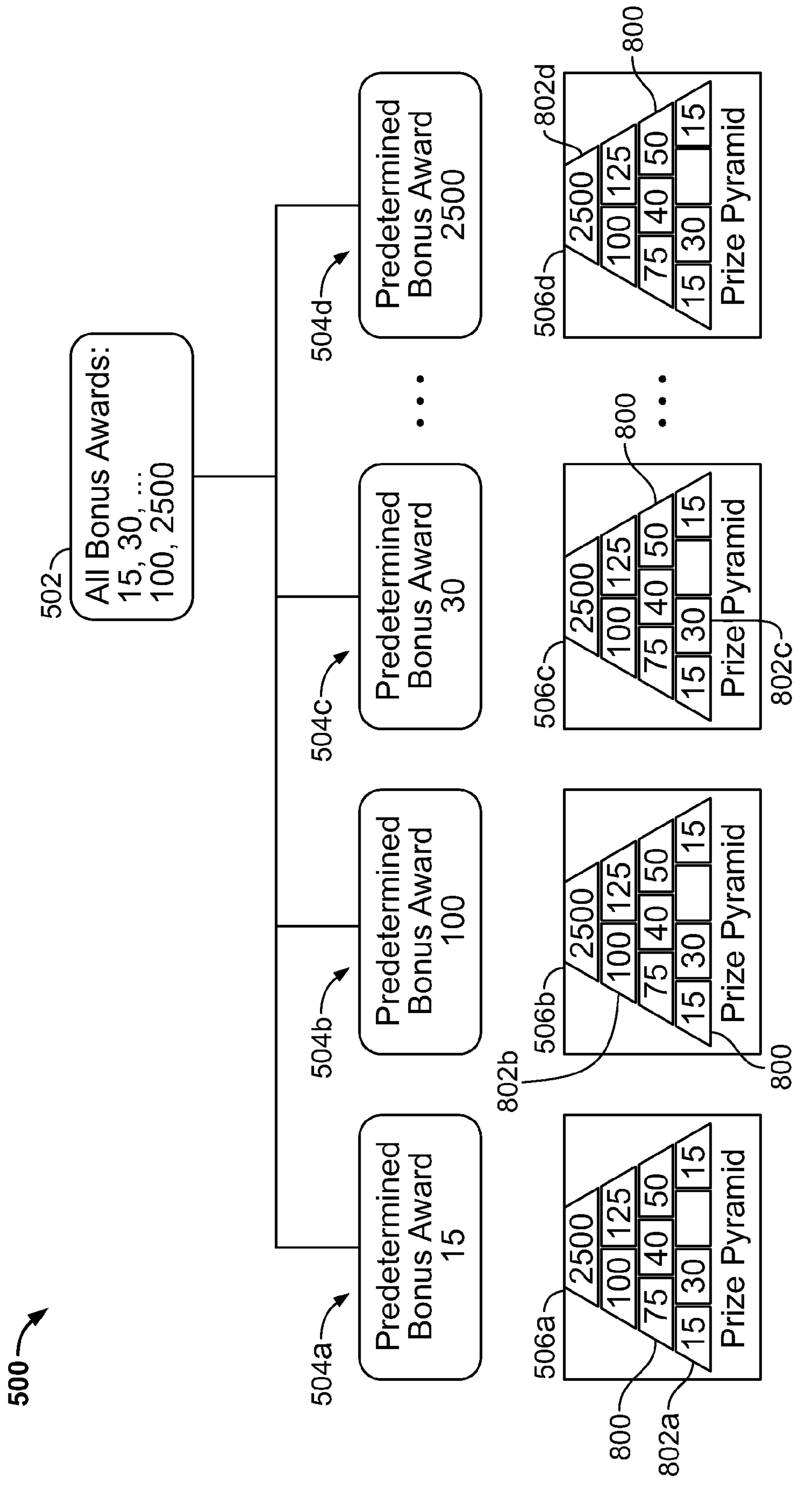
FIG. 8 is an exemplary gaming system in which each EGD displays both decoy awards and a predetermined award in a prize pyramid in accordance with a specific, non-limiting aspect of the present disclosure.

FIG. 8 illustrates an exemplary gaming system 500 in which each EGD 504*a,b,c,d* displays the bonus awards in a prize pyramid 800. The prize pyramid 800 form factor is but one of a myriad of visually pleasing arrays or arrangements in which the possible bonus awards can be arranged for display to the player. In this example, there are only nine participating EGDs, so each EGD 504*a-d* displays on its corresponding video display 506*a-d* the same set of possible bonus awards (all nine bonus awards for the nine participating EGDs, which include one predetermined bonus award for the corresponding EGD and eight other decoy bonus awards) in the prize pyramid 800. The prize pyramid 800 displays all nine possible bonus awards, including the predetermined bonus award to be awarded at the EGD 504. For example, the predetermined bonus award 802*a* for the EGD 504*a* appears in the prize pyramid 800 along with eight decoy bonus awards. Thus, the predetermined bonus award 802*a* has not yet been revealed to the player, even though the player can see the predetermined bonus award 802*a* on the bonus screen of the video display 506*a*, the player does not yet know that the predetermined bonus award 802*a* will be awarded at this stage of the bonus award show. Likewise, the predetermined bonus award 802*b* for the EGD 504*b* appears in the prize pyramid 800, though in a different location. The predetermined bonus award 802*c* for the EGD 504*b* appears in the prize pyramid 800 as shown. Finally, the predetermined bonus award 802*d* for the EGD 504*d* appears in the prize pyramid 800. Unbeknownst to the player of EGD 504*d* at this stage of the bonus award show is that the predetermined bonus award 802*d* is the highest bonus award among all nine possible bonus awards to be awarded in this bonus event. The main controller 502 stores the complete set of predetermined bonus awards as described earlier. That complete set of predetermined bonus awards was communicated to the EGDs at the start of the bonus event.

Figure 9:
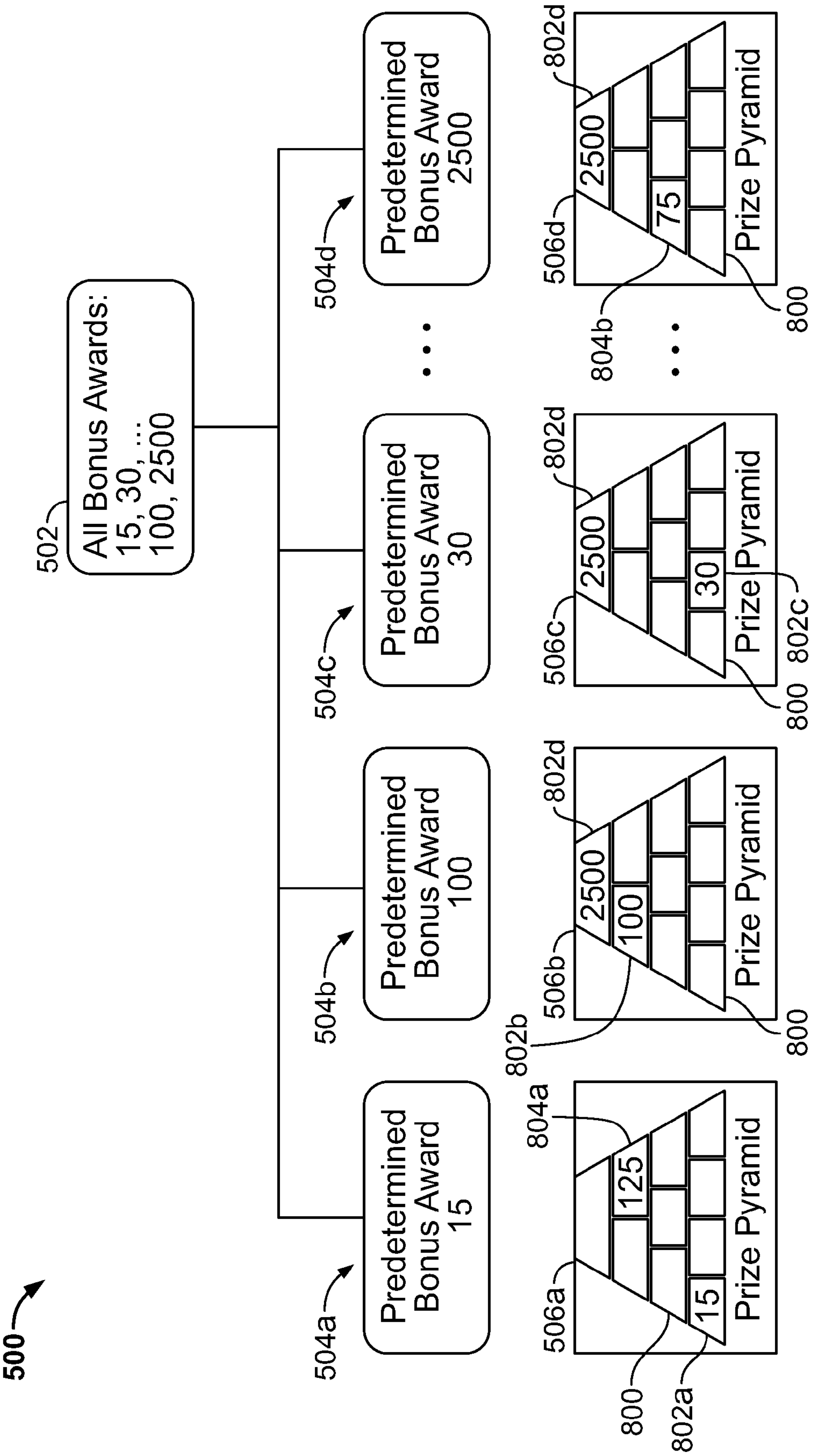
FIG. 9 illustrates the exemplary gaming system of FIG. 8 in which each of the EGDs display two remaining possible awards, one of which is a winning predetermined bonus award and the other of which is a decoy award.

Each EGD 504*a,b,c,d* removes or obscures the decoy bonus awards, one at a time, from the prize pyramid 800. In FIG. 9, two bonus awards remain on each of the prize pyramids 800 displayed by the EGDs 504*a-d*. For EGD 504*a*, the predetermined bonus award 802*a* is displayed along with a decoy bonus award 804*a*. Again, at this point, the predetermined bonus award 802*a* has not yet been revealed to the player, because the player does not yet know which of the two remaining possible bonus awards will be awarded to the player. For EGD 504*b*, the predetermined bonus award 802*b* is displayed along with a decoy bonus award 802*d*. Note that the decoy bonus award 802*d* has the largest value of the possible bonus awards, and remains the longest on the prize pyramid 800 to increase anticipation and excitement. At this stage of the bonus award show, the player of EGD 504*b* does not know which of the two possible bonus awards will be awarded. For EGD 504*c*, the predetermined bonus award 802*c* is displayed along with the decoy bonus award 802*d*. For EGD 504*d*, the predetermined bonus award 802*d* (note that for EGD 504*d*, the predetermined bonus award 802*d* is a winning bonus award) and a decoy bonus award 804*b* are displayed in the prize pyramid 800.

Figure 10:
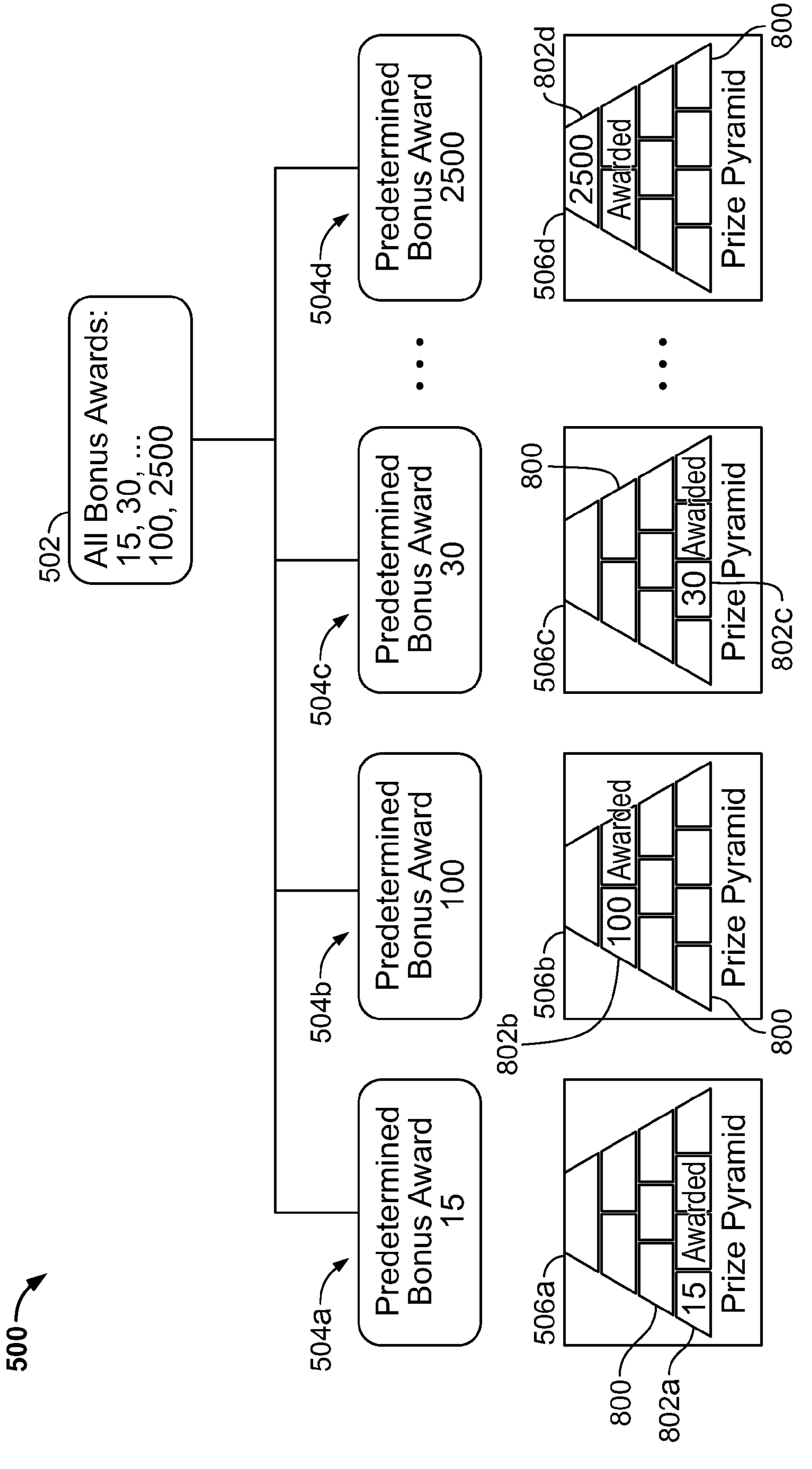
FIG. 10 illustrates the exemplary gaming system of FIG. 8 in which the bonus award show has ended, revealing all of the predetermined bonus awards on the respective video displays of the EGDs.

In FIG. 10, the end of the bonus award show is shown. All of the predetermined bonus awards 802*a,b,c,d* are revealed on the corresponding prize pyramids 800 of the corresponding EGDs 504*a,b,c,d* along with an optional text (e.g., "awarded") or graphic to indicate that the remaining predetermined bonus award will be awarded at that EGD 504*a,b,c,d*. Each EGD 504*a,b,c,d* has now revealed the associated predetermined bonus award that was originally randomly determined upon triggering the bonus event. The EGD 504*d* can produce enhanced audio or visual effects relative to the audio or visual effects produced by the EGD 504*a,b,c* at the conclusion of the bonus award show to draw attention to the fact that the EGD 504*d* produced the highest bonus award of the complete set of predetermined bonus awards during the bonus event.

Instead of simultaneously removing or obscuring the decoy bonus awards, one at a time, from the prize pyramid 800, alternately, the predetermined bonus awards 802*a,b,c,d* can be revealed in order from lowest value to highest value. In the example of FIG. 10, the EGD 504*a* is the first to reveal the predetermined bonus award 802*a*, leaving the players at the EGDs 504*b,c,d* wondering whether they will be the last player to whom the predetermined bonus award will be revealed. Next, the EGD 504*c* reveals its predetermined bonus award 802*c*, leaving the players at EGDs 504*b* and 504*d* wondering whether they won the largest bonus award 802*d*. Next, the EGD 504*b* reveals its predetermined bonus award 802*b*, and finally the EGD 504*d* reveals its predetermined bonus award 802*d*.

The algorithms 600, 700 or any other algorithm disclosed herein corresponds to specially programmed instructions executed by one or more general purpose controllers, such as one or both of the controller 42, 502, for example. The structure(s) corresponding to the functions or acts carried out or performed by the algorithm 600, 700 or any other algorithm disclosed herein is/are the controller 42, the controller 502, or the external systems 46, or any combination thereof, specially programmed for carrying out or performing the specified functions or acts. It is emphasized that any of the functions or acts for implementing any of the algorithms disclosed herein can be carried out or performed by more than one general purpose controller or computer.

It should be noted that the algorithm 600, 700 and other algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

While particular embodiments and applications of the present disclosure have been illustrated and described, it is to be understood that this disclosure is not limited to the precise construction and compositions disclosed herein and that various modifications, changes, and variations can be apparent from the foregoing descriptions without departing from the spirit and scope of the invention as defined in the appended claims.

What is claimed is:

1. A gaming system, comprising:

an input device configured to receive an indication of a wager;

a plurality of electronic gaming devices, each of the electronic gaming devices having at least one display and each displaying on the corresponding at least one display a primary wagering game; and a main controller in communication with each of the electronic gaming devices, the main controller being operative to, in response to a triggering of a bonus event in which the gaming devices participate:

randomly determine a respective bonus award for each of the gaming devices or receive from each of the gaming devices the respective randomly determined bonus award, each of the randomly determined bonus awards being awarded at a respective one of the gaming devices, store in a memory device a complete set of the randomly determined bonus awards, and communicate to a first of the gaming devices a set of possible bonus awards, the set of possible bonus awards including the respective randomly determined bonus award being awarded at the first gaming device and a plurality of decoy bonus awards corresponding to some or all of the randomly determined bonus awards being awarded at the other gaming devices that will not be awarded at the first gaming device, causing the first gaming device to display on the at least one display of the first gaming device (a) the set of possible bonus awards, (b) an indication that the decoy bonus awards will not be awarded at the first gaming device during the bonus event, and (c) an indication that the respective randomly determined bonus award associated with the first gaming device is the randomly determined bonus award to be awarded to a player of the first gaming device.

2. The gaming system of claim 1, wherein the decoy bonus awards are obscured or removed, or both, sequentially, one at a time, from display on the at least one display of the first gaming device in a bonus award show lasting a duration of time until the respective randomly determined bonus award being awarded at the first gaming device remains displayed, whereupon the respective randomly determined bonus award being awarded at the first gaming device is known to the player for the first time since the triggering of the bonus event.

3. The gaming system of claim 1, wherein the main controller is further operative to:

communicate to a second of the gaming devices a second set of possible bonus awards, the second set of possible bonus awards including the respective randomly determined bonus award being awarded at the second gaming device and a second plurality of decoy bonus awards corresponding to some or all of the randomly determined bonus awards being awarded at the other gaming devices that will not be awarded at the second gaming device, causing the second gaming device to display on the at least one display of the second gaming device (a) the second set of possible bonus awards, (b) an indication that the second set of decoy bonus awards will not be awarded at the second gaming device, and (c) an indication that the respective randomly determined bonus award associated with the second gaming device is the randomly determined bonus award to be awarded to a player of the second gaming device.

4. The gaming system of claim 1, wherein each of the gaming devices includes a respective controller that is operative to:

randomly determine the respective bonus award associated with that gaming device; and communicate to the main controller the respective randomly determined bonus award.

5. The gaming system of claim 1, wherein the main controller is further operative to randomly determine a plurality of outcomes, each of which is associated with one of the randomly determined bonus awards associated with one of the gaming devices.

6. The gaming system of claim 1, wherein the main controller is further operative to determine, for each of the gaming devices, a respective subset of the randomly determined bonus awards to be communicated to each of the gaming devices as a subset of possible bonus awards for display on the corresponding at least one display of each of the gaming devices, wherein each subset of possible bonus awards includes the randomly determined bonus award being awarded at the respective gaming device and decoy awards corresponding to some of the randomly determined bonus awards that will not be awarded at the respective gaming device during the bonus event.

7. The gaming system of claim 1, wherein the respective randomly determined bonus award being awarded at the first gaming device represents an opportunity to participate in a second bonus round in which bonus awards available to be won in the second bonus round are more valuable than the respective randomly determined bonus award associated with the first gaming device.

8. The gaming system of claim 1, wherein the main controller is further operative to:

determine which of the randomly determined bonus awards is the largest bonus award having the highest value among all the randomly determined bonus awards, communicate to the gaming device associated with the largest bonus award an indication that the gaming device associated with the largest bonus award is associated with the largest bonus award, and cause the gaming device associated with the largest bonus award to produce enhanced visual or audio effects, or both, relative to the visual or audio effects produced by the other gaming devices in response to the largest bonus award being revealed on the at least one display of the gaming device associated with the largest bonus award.

9. The gaming system of claim 1, wherein the main controller is in one of the gaming devices.

10. A method of conducting a wagering game, the method comprising:

receiving an indication of a wager via an input device;

displaying a primary wagering game on at least one corresponding display of each of a plurality of electronic gaming devices;

in response to a triggering of a bonus event in which the gaming devices participate:

randomly determining a respective bonus award for each of the gaming devices, each of the bonus awards being awarded at a respective one of the gaming devices, storing in a memory device a complete set of the randomly determined bonus awards, and communicating a set of possible bonus awards that include at least some of the randomly determined bonus awards; and responsive to receiving the set of possible bonus awards, displaying on the at least one display of a first of the gaming devices (a) the set of possible bonus awards, which includes the respective randomly determined bonus award being awarded at the first gaming device and a plurality of decoy bonus awards corresponding to some or all of the randomly determined bonus awards being awarded at the other gaming devices that will not be awarded at the first gaming device, (b) an indication that the decoy bonus awards will not be awarded at the first gaming device, and (c) an indication that the respective randomly determined bonus award associated with the first gaming device is the randomly determined bonus award to be awarded to a player of the first gaming device.

11. The method of claim 10, further comprising obscuring or removing, or both, sequentially each of the decoy bonus awards, one at a time, from display on the at least one display of the first gaming device in a bonus show lasting a duration of time until the respective randomly determined bonus award being awarded at the first gaming device remains displayed, whereupon the respective randomly determined bonus with being awarded at the first gaming device is known to the player for the first time since the triggering of the bonus event.

12. The method of claim 11, wherein the duration of the award show is dependent upon at least the types or values of the randomly determined bonus awards to be awarded.

13. The method of claim 10, further comprising, responsive to the respective randomly determined bonus award being awarded at the first gaming device being the largest bonus award among the randomly determined bonus awards, producing enhanced visual or audio effects, or both, relative to the visual or audio effects produced by the other gaming devices in response to the largest bonus award being revealed on the at least one display of the first gaming device.

14. The method of claim 10, further comprising:

randomly determining an outcome that is associated with the respective randomly determined bonus award; and communicating to a main controller communicatively linked to the gaming devices the outcome of the respective randomly determined bonus award.

15. A gaming system, comprising:

a plurality of electronic gaming devices, each of the electronic gaming devices having at least one display and each displaying on the corresponding at least one display a primary wagering game, and each including a corresponding controller; and a main controller in communication with each of the gaming devices, the main controller being operative to, in response to a triggering of a bonus event in which the gaming devices participate:

randomly determine a respective bonus award for each of the gaming devices or receive from each of the gaming devices the respective randomly determined bonus award, each of the randomly determined bonus awards being awarded at a respective one of the gaming devices, store in a memory device a complete set of the randomly determined bonus awards, and communicate to a first of the gaming devices a set of possible bonus awards, which includes the respective randomly determined bonus award being awarded at the first gaming device and a plurality of decoy bonus awards corresponding to some or all of the randomly determined bonus awards being awarded at the other gaming devices that will not be awarded at the first gaming device during the bonus event, wherein the controller of the first gaming device is operative to:

direct the at least one display of the first gaming device to display (a) the possible bonus awards, (b) an indication that the decoy bonus awards will not be awarded at the first gaming device during the bonus event, and (c) an indication that the respective randomly determined bonus award associated with the first gaming device is the randomly determined bonus award to be awarded to a player of the first gaming device.

16. The gaming system of claim 15, wherein the controller of the first gaming device is further operative to obscure or remove, or both, sequentially the decoy bonus awards, one at a time, from display on the at least one display of the first gaming device in a bonus award show lasting a duration of time until the respective randomly determined bonus award being awarded at the first gaming device remains displayed, whereupon the respective randomly determined bonus award being awarded at the first gaming device is known to the player for the first time since the triggering of the bonus event.

17. The gaming system of claim 15, wherein each of the gaming device controllers is operative to:

randomly determine the respective bonus award associated with that gaming device; and communicate to the main controller the respective randomly determined bonus award.

18. One or more non-transitory computer-readable storage media encoded with instructions which, when executed by one or more processors, cause a gaming system to perform operations comprising:

receiving an indication of a wager via an input device;

causing a primary wagering game to be displayed on at least one corresponding display of each of a plurality of electronic gaming devices;

in response to a triggering of a bonus event in which the gaming devices participate:

randomly determining a respective bonus award for each of the gaming devices or receiving from each of the gaming devices the respective randomly determined bonus award, each of the randomly determined bonus awards being awarded at a respective one of the gaming devices, storing in a memory device the randomly determined bonus awards, and communicating sets of possible bonus awards to the gaming devices; and responsive to receiving a set of possible bonus awards, causing the at least one display of a first of the gaming devices to display (a) the set of possible bonus awards, which includes the respective randomly determined bonus award being awarded at the first gaming device and a plurality of decoy bonus awards corresponding to some or all of the randomly determined bonus awards being awarded at the other gaming devices that will not be awarded at the first gaming device during the bonus event, (b) an indication that the decoy bonus awards will not be awarded at the first gaming device, and (c) an indication that the respective randomly determined bonus award associated with the first gaming device is the randomly determined bonus award to be awarded to a player of the first gaming device.

19. The computer-readable storage media of claim 18 encoded with additional instructions which cause the gaming system to perform operations comprising:

obscuring or removing, or both, sequentially each of the decoy bonus awards, one at a time, from display on the at least one display of the first gaming device in a bonus show lasting a duration of time until the respective randomly determined bonus award being awarded at the first gaming device remains displayed, whereupon the respective randomly determined bonus award being awarded at the first gaming device is known to the player for the first time since the triggering of the bonus event.

20. The computer-readable storage media of claim 18, wherein the duration of the award show is dependent upon at least the types or values of the randomly determined bonus awards to be awarded.

21. A method of conducting a wagering game, the method comprising:

displaying a primary wagering game on each of a plurality of gaming apparatuses;

in response to a triggering of a bonus event in which the gaming apparatuses participate:

randomly determining a respective bonus award for each of the gaming apparatuses or receiving from each of the gaming apparatuses the respective randomly determined bonus award, each of the randomly determined bonus awards being awarded at a respective one of the gaming apparatuses, storing in a memory device the randomly determined bonus awards, and communicating to the gaming apparatuses sets of possible bonus awards that include at least some of the randomly determined bonus awards; and responsive to receiving a set of possible bonus awards, displaying on a first of the gaming apparatuses (a) the set of possible bonus awards, which includes the respective randomly determined bonus award being awarded at the first gaming apparatus and a plurality of decoy bonus awards corresponding to some or all of the randomly determined bonus awards being awarded at the other gaming apparatuses that will not be awarded at the first gaming apparatus, (b) an indication that the decoy bonus awards will not be awarded at the first gaming apparatus, and (c) an indication that the respective randomly determined bonus award associated with the first gaming apparatus is the randomly determined bonus award to be awarded to a player of the first gaming apparatus.

22. The method of claim 21, further comprising displaying on each of the other gaming apparatuses: (a) a respective set of possible bonus awards, which includes the respective randomly determined bonus award being awarded at that gaming apparatus and a plurality of decoy bonus awards corresponding to some or all of the randomly determined bonus awards being awarded at the other gaming apparatuses that will not be awarded at that gaming apparatus, (b) an indication that the respective decoy bonus awards will not be awarded at that gaming apparatus, and (c) an indication that the respective randomly determined bonus award associated with that gaming apparatus is the randomly determined bonus award to be awarded to a player of that gaming apparatus.

23. The gaming system of claim 1, wherein the main controller randomly determines the respective bonus award to be awarded at each of the gaming devices.

24. The gaming system of claim 1, wherein the main controller is further operative to determine which of the randomly determined bonus awards associated with the other gaming devices will be the decoy bonus awards in the set of possible bonus awards.

* * * * *

UNITED STATES PATENT AND TRADEMARK OFFICE
CERTIFICATE OF CORRECTION

PATENT NO. : 8,435,120 B2
APPLICATION NO. : 12/876344
DATED : May 7, 2013
INVENTOR(S) : Hornik et al.

It is certified that error appears in the above-identified patent and that said Letters Patent is hereby corrected as shown below:

In the Claims

In column 20, line 6 (claim 11, line 8), please delete “with” and insert -- award --, therefor.

Signed and Sealed this
Thirty-first Day of December, 2013

Margaret A. Focarino

Margaret A. Focarino
*Commissioner for Patents of the United States Patent and Trademark Office*